United States Patent Office 3,767,801
Patented Oct. 23, 1973

3,767,801
SUPPOSITORY COMPOSITIONS AND PROCESS FOR THE PREPARATION THEREOF
Rudolf Tuma and Rotraud Lebender, Witten (Ruhr), Germany, assignors to Dynamit Nobel Aktiengesellschaft, Troisdorf, Germany
No Drawing. Filed Jan. 27, 1971, Ser. No. 110,281
Claims priority, application Germany, Jan. 30, 1970, P 20 04 098.6
Int. Cl. A61k *9/02;* C11c *3/02*
U.S. Cl. 424—230      24 Claims

ABSTRACT OF THE DISCLOSURE

Suppository compositions having a melting point of less than 37° C. are prepared by esterifying glycerin with a fatty acid mixture melting at 31–36° C. and consisting essentially of 70–82% by weight of lauric acid, 6–22% by weight of myristic acid and 6–22% by weight of palmitic acid. The resulting masses are non-brittle, substantially free from partial esters and essentially inert to additives, such as aspirin.

BACKGROUND OF THE INVENTION

This invention relates to suppository compositions and to a process for preparing the same. More particularly, it relates to non-brittle, practically partial-ester-free suppository masses or compositions having a melting point of below 37° C. The invention is also concerned with the preparation of said suppository compositions by the esterification of glycerin with a fatty acid mixture containing lauric, myristic and palmitic acid in certain weight proportions.

Cocoa butter has been utilized for a long time as the fat base for the manufacture of suppositories since this material is the only natural fat exhibiting, with a melting point adapted to the temperature of the body, the necessary hardness and firmness (solidity). There have been a great number of efforts over the years to find products and processes for replacing cocoa butter as the suppository composition. Suggestions have been advanced to employ triglycerides having a melting point similar to the body temperature, such as hardened peanut oil, palm nut stearin or other fats. U.S. Pat. 2,055,063 suggests the use of fatty acid esters of stearic, palmitic, myristic and lauric acid with glycerin or glycols. In U.S. Pat. 2,238,441, re-esterification products of fatty acids of coconut oil or palm nut oil are disclosed. In order to properly adjust the melting point, such re-esterification products of coconut or palm nut oil receive an addition of higher-melting glycerides of palmitic to arachic acid (German Pat. 974,938). In some cases, the raw materials or the re-esterification products are hardened (U.S. Pat. 2,684,970), or the fatty acid forerunnings are eliminated (U.S. Pat. 2,684,970; DAS [German published application] 1,177-774).

The desire for a certain emulsifying powder of the suppository composition was met by the formation of certain amounts of partial esters in the disclosed re-esterification products (U.S. Pat. 2,684,970; German Pat. 1,015,-576). The melting point adjustment of the suppository compositions was also controlled by the use of definite fatty acid compositions during the esterification of the raw materials (British Pat. 785,933; German Pat. 1,016,902). The utilization of an eutectic effect of glycerides containing partial esters in dependence upon the hydroxyl number has also been described (German DAS 1,101,699 and 1,108,858). A solution for reducing the relatively large intervals between the points of solidification and melting in suppository compositions containing partial esters has been described in German DAS 1,128,600 by mixing monoacid esters of dihydric and trihydric alcohols. Also, in accordance with German Pat. 941,014, natural fats are split, the thus-obtained free fatty acids are subjected to fractional distillation, the lower fatty acids are removed, and the remaining fraction of fatty acids of about 12–16 carbon atoms is esterified with glycerin or another polyhydric alcohol in such a manner that partial esters with free hydroxyl groups are produced. These partial esters, finally, are mixed with esters of fatty acids of 16–20 carbon atoms in such a proportion that the mixture exhibits a melting point corresponding to the body temperature.

As described in these various references, the resultant suppository compositions are obtained as hard, brittle fats. This sometime result in considerable difficulties during processing into the shape of the suppositories, because of crack formation, depending on the type and consistency of the pharmaceuticals to be incorporated therein. Additionally, suppository compositions exhibiting a hydroxyl number—generally ranging between 10 and 50—can result in incompatibility with certain pharmaceuticals. For example, acetylsalicylic acid (aspirin) reacts with the free hydroxyl groups of the partial esters and, thus, is partially prevented from being resorbed during administration, thereby lessening the effective therapeutic effects thereof. Consequently, there is much interest in the art in obtaining a practically hydroxyl-free, non-brittle suppository composition.

Accordingly, one of the objects of the present invention is to provide improved suppository masses or compositions which overcome the disadvantages and deficiencies of the prior art products. Another object of the invention is to provide a process for producing substantially partial ester-free suppository compositions which may be carried out in an efficacious and relatively simple manner.

A further object of the invention is to provide non-brittle, substantially partial ester-free suppository compositions having a melting point below 37° C.

These and other objects and advantages of the present invention will become apparent to those skilled in the art from a consideration of the following specification and claims.

In accordance with the present invention, it has been found that a suppository composition is not afflicted with the deficiencies inherent in the previously described and employed products if the composition consists essentially of the practically partial ester-free esterification product of glycerin and a fatty acid mixture melting between 31° and 36° C. and containing lauric, myristic and palmitic acid in certain proportions by weight. More specifically, this invention is concerned with suppository compositions melting at below 37° C., obtained by the esterification of a fatty acid mixture containing 70–82% by weight of lauric acid, 6–22% by weight of myristic acid and 6–22% by weight of palmitic acid with glycerin to give substantially partial ester-free triglycerides. Processes for the preparation of these suppository compositions are described in more detail below.

The suppository masses of the invention, which are practically free of partial esters, exhibit an extreme temperature elasticity or flexibility with respect to crack formation during the shaping of the suppositories, so that hardly any rejects due to cracked products occur during the industrial production of suppositories made therefrom. The compositions of the invention exhibit a very narrow melting interval and very brief solidification times. They are neutral, i.e., inert, with respect to effective and beneficial agents to be incorporated therein.

The suppository compositions of the invention are prepared by the esterification of glycerin having a purity of at least 98% with a fatty acid mixture containing 70–82% by weight of lauric acid, 6–22% by weight of myristic acid and 6–22% by weight of palmitic acid, the fatty acid mixture being present in an excess of about 1–3% with respect to the amount of starting substance stoichiometrically required for saturating the glycerin, by quickly heating the mixture under a vacuum or an inert gas up to a temperature of 205–215° C. and maintaining this temperature under a full vacuum or under a vigorous stream of inert gas, such as nitrogen, until the esterification is terminated, i.e., until an acid number is attained in the crude ester which approximately corresponds to the excess of fatty acid employed. In one embodiment of this procedure, the reaction mixture is heated rapidly to a temperature of 205° to 215° C. under a vacuum of about 300 torr, the vacuum is increased to about 10 torr over a period of approximately 2 hours while maintaining the temperature, and then the esterification is continued for approximately an additional 3 hours under vacuum. The presently described suppository compositions can also be produced by the esterification of stoichiometric amounts of fatty acid and glycerin under normal pressure in an inert gas atmosphere by uniform, but not too rapid heating up to about 160–180° C., maintaining the reaction mixture at this temperature until the expected amount of the water of reaction has been just about removed, subsequently raising the temperature to 205–215° C., and thereafter gradually applying a vacuum to facilitate the removal of the residual water. The reaction is terminated when the crude ester reaches an acid number of about 2. In one embodiment of this mode of operation, the reaction mixture is heated to a temperature of 160° to 180° C. under the inert gas atmosphere, the reaction mixture is maintained at this temperature until the expected amount of water of the reaction has been approximately driven off, the temperature is increased to 205° to 215° C. and a vacuum is applied which is gradually increased to about 10 torr until the reaction product has an acid number of about 2. Subsequently the reaction product may be cooled prior to forming a suppository mass therefrom. This particular mode of operation extensively avoids the entrainment of fatty acid present in the steam chamber by the discharged water of reaction, such fatty acid thus becoming lost to the esterification, which according to experience can be recognized from the hydroxyl numbers in the thus-formed triglyceride in the range of between 5 and 20.

The crude esters obtained in accordance with the above-described processes are refined, deodorized and bleached according to conventional procedures and can then be employed as suppository compositions.

In the esterification processes described above, conventional and suitable esterification catalysts are employed. Preferred catalysts include titanium compounds, such as tetrabutyl titanate and titanyl lactate.

The following examples are given merely as illustrative of the present invention and are not to be considered as limiting. Unless otherwise noted, the percentages therein and throughout the application are by weight.

EXAMPLE 1

92 kg. of a fatty acid mixture having an acid number of 271, consisting of 82% by weight of lauric acid, 8.5% by weight of myristic acid and 9.5% by weight of palmitic acid, is heated without delay to about 205° C. with 13.6 kg. of glycerin having a purity of 98% in the presence of 20 g. of tetrabutyl titanate as the catalyst, under a vacuum of about 300 torr (mm. Hg), and is maintained at this temperature. As soon as the main amount of the water of reaction to be expected has been removed, the vacuum is gradually raised until the process is finally conducted at 205° C. and 10 torr. The esterification is terminated as soon as the reaction product reaches an acid number of about 5.5, corresponding to the excess of fatty acid employed of about 2%.

The crude ester is refined and deodorized in a conventional manner. Approximately 94 kg. of a triglyceride usable as a suppository composition is obtained, having the following characteristics:

Acid number _____ Below 0.1.
Saponification number _____ 255.
Hydroxyl number _____ 2.8.
Iodine number _____ Below 1.
Melting point _____ 33.5° C.

Upon being poured into molds having a temperature of 10° C., the solidification of the shaped suppositories takes about 3 minutes. The suppositories exhibit neither cracks nor signs of breakage. The shaped products withstand a load of 3.7 kg. without being deformed at a temperature of 31° C. The composition is indifferent or inert to pharmaceuticals which can react with free hydroxyl groups.

EXAMPLE 2

90 kg. of a fatty acid mixture having an acid number of 267, consisting of 76.4% by weight of lauric acid, 7.3% by weight of myristic acid and 16.3% by weight of palmitic acid, is heated with 13.4 kg. of glycerin having a purity of 98% in the presence of 20 g. of titanyl lactate as the catalyst, under normal pressure and in an inert gas atmosphere, uniformly, but not too quickly, to 170° C. The reaction mixture is maintained at this temperature until the main amount of the water of reaction to be expected has been driven off. Then, the temperature is raised under the gradual application of a vacuum, until the process is conducted under a substantially full vacuum and at a temperature of 215° C. The reaction is terminated as soon as the crude ester has reached an acid number of between 1 and 2. After refining and deodorizing, approximately 93 kg. of a triglyceride usable as a suppository composition is obtained having the following characteristic data:

Acid number _____ Below 0.1.
Saponification number _____ 250.
Hydroxyl number _____ 1.
Iodine number _____ Below 1.
Melting point _____ 32.9° C.

When cast in molds cooled to 10° C., the suppository composition solidifies within 3.5 minutes. The shaped suppositories do not exhibit any cracks or breakage. Even when elevated to a temperature of 31° C. the suppositories are able to withstand a load of 2 kg. without being deformed. The suppository masses are indifferent, for example, to acetylsalicylic acid.

EXAMPLE 3

90 kg. of a fatty acid mixture having an acid number of 269, consisting of 75% by weight of lauric acid, 19% by weight of myristic acid and 6% by weight of palmitic acid, is esterified with 13.5 kg. of glycerin having a purity of 98% under the conditions and in the manner as described in Example 2. The resultant triglyceride, usable as a suppository composition, has the following characteristics:

Acid number _____ Below 0.1.
Saponification number _____ 251.
Hydroxyl number _____ 0.
Iodine number _____ Below 1.
Melting point _____ 34.0° C.

Cast in molds at 10° C., the suppositories solidify within 4 minutes. After removal from the molds, they exhibit no signs of breakage or cracks. At 31° C., they are able to withstand a load of 4 kg. without deformation. The suppository compositions are indifferent with respect to reactive pharmaceuticals.

In Table 1, the characteristic data and physical properties of the suppository compositions produced in accordance with German DAS 1,101,699 and U.S. Pat.

2,684,970 are compared with those of the suppository compositions obtained in accordance with the present invention. This comparison clearly demonstrates the advance in the art resulting from the present invention.

TABLE 1

| | Suppository composition corresponding to— | | Suppository composition corresponding to the present application | | |
|---|---|---|---|---|---|
| | German DAS 1, 101,699 Ex. 1 | U.S. Patent 2,684,970 Ex. 3 | Ex. 1 | Ex. 2 | Ex. 3 |
| Fatty acid composition,[1] percent by weight: | | | | | |
| Below C 12 | 4 | 3.5 | | | |
| C 12 | 47 | 51.0 | 82.0 | 76.4 | 75.0 |
| C 14 | 19 | 19.6 | 8.5 | 7.3 | 19.0 |
| C 16 | 11 | 10.9 | 9.5 | 16.3 | 6.0 |
| C 18 | 19 | 15.0 | | | |
| Oleic acid | | 1.2 | | | |
| Glyceride composition,[2] mole percent: | | | | | |
| $C_{12-12-12}$ | 8.0 | 17.1 | 58.1 | 51.2 | 47.1 |
| $C_{12-12-14}$ | 8.5 | 17.4 | 17.3 | 12.9 | 31.4 |
| $C_{12-12-16}$ | | 8.6 | 17.3 | 25.8 | 8.9 |
| $C_{12-12-18}$ | 6.9 | 10.2 | | | |
| $C_{12-14-14}$ | | 5.9 | | | 7.0 |
| $C_{12-14-16}$ | | 5.8 | | | |
| $C_{12-14-18}$ | | 6.9 | | | |
| $C_{12-12}$-OH | 9.3 | | | | |
| $C_{12-14}$-OH | 6.6 | | | | |
| $C_{2-18}$-OH | 5.3 | | | | |
| Others (below 5%) | 55.4 | 26.1 | 7.3 | 10.1 | 5.6 |
| Number of the possible glycerides without isomers | 56 | 56 | 10 | 10 | 10 |
| Characteristic data:[3] | | | | | |
| Hydroxyl number | 50 | 13 | 2.8 | 1 | 0 |
| Melting point (° C.) | 34.5 | 35.1 | 33.5 | 32.9 | 34.0 |
| Solidification point | 30.5 | 34.0 | 32.7 | 32.0 | 33.3 |
| Brittleness,[4] defects in percent at: | | | | | |
| 20° C | 2 | 5 | 0 | 0 | 0 |
| 10° C | 13 | 26 | 0 | 0 | 0 |
| 0° C | 58 | 65 | 18 | 35 | 19 |
| Strength (firmness),[5] in kg. at 31° C | 0.8 | 1.0 | 3.7 | 2.0 | 4.0 |
| Melting behavior,[6] percent solid glycerieds at: | | | | | |
| 5° | 100 | | | | |
| 10° | 98.9 | | | | |
| 15° | 92.9 | | | | |
| 20° | 87.8 | 100 | 100 | 100 | 100 |
| 25° | 73.1 | 92 | 100 | 100 | 100 |
| 30° | 44.0 | 64 | 82 | 50 | 89 |
| 35° | 8.3 | 31 | 27 | 8 | 17 |
| 40° | 0 | 9 | 0 | 0 | 0 |
| 45° | 0 | 5 | 0 | 0 | 0 |
| 50° | 0 | 0 | 0 | 0 | 0 |

[1] Determined by gas chromatogram.
[2] Calculated from the farty acid composition according to the theory of statistical distribution (Bailey, Industrial Oil and Fat Products, 1951, page 834 et seq.).
[3] Determined in accordance with DGF unit methods: Hydroxyl number C-V 17a (53); Melting point C-IV 3a (52); Solidification point C-IV 3c (52); (Shukoff method).
[4] Method employed: From a fat melt of 35° C., a total of 150 shaped bodies is cast for each individual test in cooled suppository molds of 20°, 10°, or 0° C. and, after removal from the molds, the suppositories having cracks or breaks are counted; the amount of the defective cast suppositories is expressed in percent.
[5] Method employed: See, in this connection, "Fette, Seifen, Anstrichmittel" [Fats, Soaps, Paints] (1963), pp. 654 et seq., article by W. Baenitz: "Beitrag zum Problem der Konsistenzbeurteilung von Hartfetten in der Suesswarenindustrie" [Contribution to the Problem of Judging the Consistency of Hard Fats in the Candy Industry].
[6] Calculated from dilatation curves, determined according to the DGF (Deutsche Gesellschaft für Fettwissenschaft) unit method, H. P. Kaufmann, "Analyse der Fette und Fettprodukte" [Analysis of the Fats and Fat Products] (1958), pp. 672 et seq.

The invention being thus described, it will be obvious that the same may be varied in many ways. Such variations are not to be regarded as a departure from the spirit and scope of the invention, and all such modifications as will be obvious to one skilled in the art are intended to be included herein.

We claim:
1. A non-brittle suppository composition substantially free from partial esters and having a melting point of less than 37° C. comprising the esterification product of glycerine with a fatty acid mixture having a melting point of 31–36° C. and a composition consisting essentially of 70–82% by weight of lauric acid, 6–22% by weight of myristic acid and 6–22% by weight of palmitic acid.

2. A suppository composition in accordance with claim 1, wherein the glycerin has a purity of at least 98%.

3. A suppository composition in accordance with claim 1, wherein said fatty acid mixture has an acid number of 271 and a composition consisting essentially of 82% by weight of lauric acid, 8.5% by weight of myristic acid and 9.5% by weight of palmitic acid.

4. A suppository composition in accordance with claim 1, wherein said fatty acid mixture has an acid number of 267 and a composition consisting esesntially of 76.4% by weight of lauric acid, 7.3% by weight of myristic acid and 16.3% by weight of palmitic acid.

5. A suppository composition in accordance with claim 1, wherein said fatty acid mixture has an acid number of 269 and a composition consisting essentially of 75% by weight of lauric acid, 19% by weight of myristic acid and 6% by weight of palmitic acid.

6. A suppository composition in accordance with claim 1, further including a pharmaceutical additive.

7. A suppository composition in accordance with claim 6, wherein the additive is acetylsalicyclic acid.

8. A process for the preparation of a non-brittle suppository mass substantially free from partial esters and having a melting point of less than 37° C. which comprises esterifying a fatty acid mixture having a melting point of 31–36° C. and a composition consisting essentially of 70–82% by weight of lauric acid, 6–22% by weight of myristic acid and 6–22% by weight of palmitic acid with glycerin in the presence of an esterification catalyst, said fatty acid mixture being employed in an excess of about 1–3% by weight with respect to the amount stoichiometrically required for the formation of the triglyceride, by heating the reaction mixture to a temperature of 205° to 215° C. under a vacuum, maintaining the reaction mixture at said temperature and under said vacuum until the acid number of the resultant ester approximately corresponds to the excess of fatty acid mixture employed, and forming a suppository mass from the resultant triglyceride composition.

9. The process of claim 8, wherein the esterification catalyst is a titanium compound conventionally used to catalyze the esterification of fatty acids.

10. The process of claim 9, wherein said titanium compound is selected from the group consisting of tetrabutyl titanate and titanyl lactate.

11. The process of claim 8, wherein the recation mixture is heated rapidly to a temperature of 205° to 215° C. under a vacuum of about 300 torr, the vacuum is increased to about 10 torr over a period of approximately 2 hours while maintaining said temperature, and then the esterification is continued for approximately an additional 3 hours under vacuum, prior to work-up of the composition to give a suppository mass.

12. The process of claim 8, wherein a pharmaceutical additive is added to the resulting suppository mass.

13. A process for the preparation of a non-brittle suppository mass substantially free from partial esters and having a melting point of less than 37° C. which comprises esterifying a fatty acid mixture having a melting point of 31–36° C. and a compostion consisting essentially of 70–82% by weight of lauric acid, 6–22% by weight of myristic acid and 6–22% by weight of palmitic acid with glycerin in the presence of an esterification catalyst, said fatty acid mixture being employed in an excess of about 1–3% by weight with respect to the amount stoichiometrically required for the formation of the triglyceride, by heating the reaction mixture to a temperature of 205° to 215° C. under an inert gas, maintaining the reaction mixture at said temperature and under said inert gas until the acid number of the resultant ester approximately corresponds to the excess of fatty acid mixture employed, and forming a suppository mass from the resultant triglyceride composition.

14. The process of claim 13 wherein said inert gas is nitrogen.

15. The process of claim 13, wherein the esterification catalyst is a titanium compound conventionally used to catalyze the esterification of fatty acids.

16. The process of claim 13, wherein a pharmaceutical additive is added to the resulting suppository mass.

17. A process for the preparation of a non-brittle suppository mass substantially free from partial esters and having a melting point of less than 37° C. which comprises esterifying a fatty acid mixture having a melting point of 31–36° C. and a composition consisting essentially of 70–82% by weight of lauric acid, 6–22% by weight of myristic acid and 6–22% by weight of palmitic acid with glycerin in the presence of an esterification catalyst, said fatty acid mixture and glycerin being employed in the stoichiometric quantities necessary for the formation of the triglyceride, by heating the reaction mixture to a temperature of 160° to 180° C. under an inert gas atmosphere, maintaining the reaction mixture at said temperature until the expected amount of water of reaction has been approximately driven off, increasing the temperature of 205°–215 C. and applying a vacuum which is gradually increased to about 10 torr until the reaction product has an acid number of about 2, cooling the resultant reaction product, and forming a suppository mass therefrom.

18. The process of claim 17, wherein said inert gas is nitrogen.

19. The process of claim 17, wherein the esterification catalyst is a titanium compound conventionally used to catalyze the esterification of fatty acids.

20. The process of claim 17, wherein a pharmaceutical additive is added to the resulting suppository mass.

21. The process of claim 17, wherein said reaction mixture is heated uniformly and slowly to said temperature of 160° to 180° C.

22. The process of claim 8, wherein the fatty acid mixture consists essentially of 75% by weight of lauric acid, 19% by weight of myristic acid and 6% by weight of palmitic acid, said fatty acid mixture having an acid number of 269 and a melting point of 33° C., whereby a substantially hydroxyl number-free, non-brittle suppository mass is obtained.

23. The process of claim 13, wherein the fatty acid mixture consists essentially of 75% by weight of lauric acid, 19% by weight of myristic acid and 6% by weight of palmitic acid, said fatty acid mixture having an acid number of 269 and a melting point of 33° C., whereby a substantially hydroxyl number-free, non-brittle suppository mass is obtained.

24. The process of claim 17, wherein the fatty acid mixture consists essentially of 75% by weight of lauric acid, 19% by weight of myristic acid and 6% by weight of palmitic acid, said fatty acid mixture having an acid number of 269 and a melting point of 33° C., whereby a substantially hydroxyl number-free, non-brittle suppository mass is obtained.

References Cited

UNITED STATES PATENTS

| | | | |
|---|---|---|---|
| 3,056,818 | 10/1962 | Werber | 260—410.6 |
| 2,667,418 | 1/1954 | Barsky et al. | 99—118 |
| 2,685,592 | 8/1954 | Barsky et al. | 260—410.7 |
| 2,988,483 | 6/1961 | Barsky et al. | 99—123 |
| 3,271,434 | 9/1966 | Baenitz | 260—410.7 |

FOREIGN PATENTS 879,211  10/1961  Great Britain.

OTHER REFERENCES

Markley: "Fatty Acids," part 2, Interscience Publishers, New York, pp. 801–805 (1961).

LEWIS GOTTS, Primary Examiner

D. G. RIVERS, Assistant Examiner

U.S. Cl. X.R.

260—410.7; 424—365